United States Patent

Goosey, Jr. et al.

[11] Patent Number: 5,500,703
[45] Date of Patent: Mar. 19, 1996

[54] REAL IMAGE ZOOM VIEWFINDER

[75] Inventors: William T. Goosey, Jr., Fairport; Lee R. Estelle, Rochester, both of N.Y.

[73] Assignee: Eastman Kodak Company, Rochester, N.Y.

[21] Appl. No.: 263,844

[22] Filed: Jun. 22, 1994

[51] Int. Cl.[6] .................................................. G03B 13/10
[52] U.S. Cl. ............................... 354/222; 359/689
[58] Field of Search ................................ 354/219, 222, 354/224, 225; 359/422, 428, 432, 676, 679, 683, 689

[56] References Cited

U.S. PATENT DOCUMENTS

| | | | |
|---|---|---|---|
| 4,751,539 | 6/1988 | Yamada et al. | 354/222 |
| 5,130,845 | 7/1992 | Ruben | 359/428 |
| 5,173,806 | 12/1992 | Ogata | 359/683 |
| 5,220,458 | 6/1993 | Ohshita | 359/689 |
| 5,323,264 | 6/1994 | Kato | 354/222 X |

*Primary Examiner*—Howard B. Blankenship
*Attorney, Agent, or Firm*—Leonard W. Treash, Jr.

[57] ABSTRACT

A real image zoom finder has a zoom portion with one or more moving elements to vary the magnification of the finder. A field lens is substantially separated from suitable erecting optics to defocus any scratches or dust on the zoom lens and also to increase the compactness of the system.

8 Claims, 1 Drawing Sheet

REAL IMAGE ZOOM VIEWFINDER

This invention relates to real image zoom viewfinders. More particularly, it relates to finders whose magnification is variable for use in a camera having an objective of variable focal length.

U.S. Pat. Nos. 5,130,845 issued to Ruben Jul. 14, 1992; and 5,247,324, issued to Estelle Sep. 21, 1993, are representative of a particular type of real image zoom viewfinder. These finders include, from the object to the eye, a zoom portion which includes two or more elements, usually two of which are movable to vary magnification, a field lens situated in an image plane of the zoom portion, suitable erecting optics, for example, a type 2 porro prism and an eyepiece. The zoom portion of the finder forms an inverted real image in the vicinity of the field lens, which real image is viewed by the finder through the erecting optics and with the help of the eyepiece. Such finders are relatively common. See also, for example, U.S. Pat. No. 5,132,838 to Ohshita, Jul. 21, 1992; U.S. Pat. No. 5,220,458 to Ohshita, Jun. 15, 1993; U.S. Pat. No. 5,173,806, Ogata, Dec. 22, 1992; and U.S. Pat. No. 4,751,539 to Yamada et al, Jun. 14, 1988.

Such finders generally provide a better image than typical reverse Galilean finders. However, they suffer from their own set of problems. An obvious problem is that because they must form a first image and then relay it, substantial length from front vertex to rear vertex is required. Secondly, although a field lens is desirable, it places one or two surfaces close to the inverted image.

The field lens prevents loss of some of the light forming the first image. It is placed at the first image to control the eye position while minimizing field aberrations. However, this condition introduces a manufacturing problem because the close proximity of the surface to the image causes it to be in focus to the eye. Accordingly, the surface must have stringent scratch, dig and dust tolerances.

SUMMARY OF THE INVENTION

It is an object of the invention to provide a compact real image zoom finder with a well controlled eye position and good field aberration connections across the zoom range, but without visibility of field lens defects.

We have found that the field lens can be separated toward the object from the inverted image plane adequately to solve the visible defect problem without adversely affecting either the eye position or field aberrations and actually provide an improvement in compactness.

More specifically, in a finder having from the object side to the eye side, a zoom portion, a field lens, inverting optics and an eyepiece, the space, BF, between the field lens and the location of the inverted image, divided by the combined focal length of all the elements toward the object from the inverting optics, at the low magnification position of the finder should be greater than 0.4 and preferably greater than 0.7.

According to a preferred embodiment, to control the eye position, reduce front element diameter and maintain a relatively large BF, the following inequality should be met:

$$<|EF_{W(II+III)}/EF_W|<1.9$$

According to another preferred embodiment, to maintain compactness of the finder, vertex to vertex, and to provide a reasonable zoom range, the following inequalities should be met:

$$1.4<EF_{II}/EF_W<2.5$$

$$0.9<VW/VT<1.1$$

In the above inequalities, BF is the space between the field lens and the inverted image; $EF_W$ is the combined focal length of the elements toward the object from the inverting optics at the low magnification position of the finder (sometimes called the wide angle position); $EF_I$, $EF_{II}$ and $EF_{III}$ are the respective focal lengths of elements I, II and III in a finder having three elements toward the object from the inverting optics, numbered from the object side; $EF_{W(II+III)}$ is the combined focal length of elements II and III while in the wide angle position in a finder with three elements in front of the inverting optics; VW is the vertex to vertex length of the finder at the low magnification position and VT is the vertex to vertex length of the finder at the high magnification position.

According to a still further preferred embodiment, the zoom portion includes only two elements, only one element of which moves to effect zooming and includes aspheres on the eye side of both of its elements. Design and location of the aspheres provide a 2X zoom finder having only one moving element in which the apparent accommodation at the eye never deviates more than a total of 0.5 diopters.

DETAILED DESCRIPTION OF THE INVENTION

Figure 1:
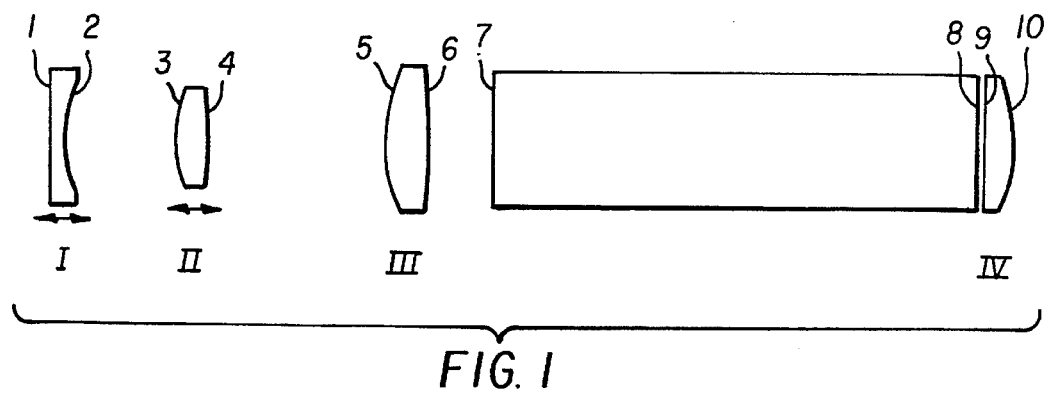
FIGS. 1 and 2 are side schematics of finders constructed according to the specifications of Examples 1 and 2, respectively.
Figure 2:
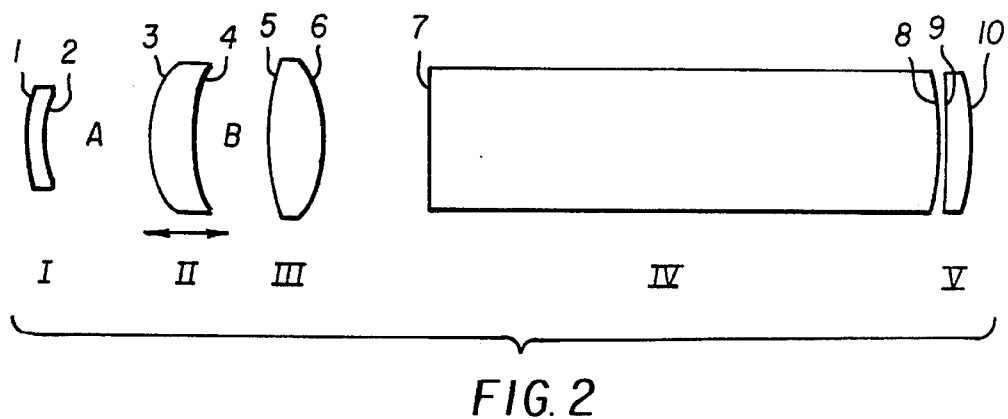

In the following examples all distances are in millimeters; the surfaces are numbered from the object side to the eye side; the indices of refraction are for the helium d line of the spectrum and V is the abbe dispersion number.

EXAMPLE 1

| SURF. | CLEAR APER. | AXIAL BEAM | RADIUS | THICKNESS | INDEX | V |
|---|---|---|---|---|---|---|
| 1 | 8.48 | 2.78 | 836.600 | 1.000 | 1.492 | 57.4 |
| 2 | 7.05 | 2.78 | ASPHERE | A | | |
| 3 | 5.88 | 2.96 | 8.06200 | 2.000 | 1.492 | 57.4 |
| 4 | 6.18 | 2.95 | ASPHERE | B | | |
| 5 | 9.08 | 0.96 | ASPHERE | 2.659 | 1.492 | 57.4 |
| 6 | 8.91 | 0.65 | −41.0030 | 4.027(BF) | | |
| 7 | 8.00 | 0.09 | PLANO | 30.500 | 1.492 | 57.4 |
| 8 | 8.33 | 3.84 | PLANO | 0.340 | | |
| 9 | 8.34 | 3.90 | ASPHERE | 1.700 | 1.492 | 57.4 |
| 10 | 8.39 | 4.09 | −11.4190 | 13.500 | | |

ASPHERIC EQUATION $$x = \frac{CY^2}{1 + \sqrt{1-(k+1)C^2Y^2}} + DY^4 + EY^6 + FY^8 + GY^{10}$$

| | | | |
|---|---|---|---|
| SURF. 2 | C = 0.1310273 | D = 0.5382800E−02 | E = −0.598600E−03 |
| | k = −24.2420000 | F = 0.4001590E−04 | G = −0.1121650E−05 |
| SURF. 4 | C = −0.0729661 | D = 0.4492600E−03 | E = 0.7668210E−04 |
| | k = −2.2770000 | F = −0.3328960E−05 | G = −0.7884800E−08 |
| SURF. 5 | C = 0.1092896 | D = 0.1927100E−02 | E = −0.7536170E−04 |
| | k = −18.4040000 | F = 0.1566340E−05 | G = −0.1207280E−07 |
| SURF. 9 | C = 0.0008410 | D = −0.7906160E−04 | E = −0.1055140E−04 |
| | k = 0.0000000 | F = 0.6476000E−06 | G = 0.1545250E−07 |

| MAG. | STOP DIAM. | FINDER LENGTH | FINDER LENGTH W/PRISM FOLD | ZOOM SPACINGS A | B | SEMI-FIELD |
|---|---|---|---|---|---|---|
| 0.281 | 4.18 | 62.709 | 39.009 | 11.944 | 8.539 | 33.85 |
| 0.390 | 3.48 | 60.370 | 36.670 | 7.075 | 11.069 | 24.79 |
| 0.541 | 3.42 | 60.407 | 36.707 | 3.562 | 14.619 | 17.31 |
| 0.753 | 3.63 | 62.781 | 39.081 | 1.026 | 19.529 | 12.11 |

EXAMPLE 1 ABERRATIONS: (Negative Astigmatism Means Tangential Field Is Closer To The Eye.)

| | .281X | .390X | .541X | .753X | | .281X | .390X | .541X | .753X |
|---|---|---|---|---|---|---|---|---|---|
| | ACCOMMODATION (DIOPTERS) | | | | | ASTIGMATISM (DIOPTERS) | | | |
| AXIS | −1.28 | −1.23 | −1.16 | −1.26 | AXIS | — | — | — | — |
| TOP | −0.79 | −0.83 | −0.95 | −1.03 | TOP | 0.00 | 0.00 | −0.14 | −0.02 |
| SIDE | −0.34 | −0.40 | −0.50 | −0.50 | SIDE | −0.27 | −0.23 | −0.26 | −0.04 |
| 0.9 FIELD | −0.15 | −0.24 | −0.34 | −0.31 | 0.9 FIELD | −0.20 | −0.22 | −0.23 | 0.07 |
| CORNER | 0.36 | 0.13 | 0.07 | 0.12 | CORNER | 0.66 | 0.03 | 0.08 | 0.35 |
| | DISTORTION (%) | | | | | LATERAL COLOR (MIN. OF ARC) | | | |
| AXIS | — | — | — | — | AXIS | — | — | — | — |
| TOP | −3.4 | −1.6 | 0.5 | 1.8 | TOP | 5.16 | 3.44 | 0.21 | −2.77 |
| SIDE | −7.9 | −5.0 | −0.7 | 3.3 | SIDE | 6.53 | 4.13 | −0.14 | −4.88 |
| 0.9 FIELD | −9.0 | −5.1 | −0.1 | 3.5 | 0.9 FIELD | 7.22 | 4.13 | −0.34 | −5.95 |
| CORNER | −10.8 | −6.2 | 0.0 | 4.4 | CORNER | 7.56 | 4.47 | −0.69 | −7.46 |

EXAMPLE 1 RETICLE SYSTEM
(With Reticle 0.5 mm Prior To Surface 7):

| | ACCOMMODATION (DIOPTERS) | | ASTIGMATISM (DIOPTERS) |
|---|---|---|---|
| AXIS | −1.18 | AXIS | — |
| TOP | −1.08 | TOP | −0.03 |
| SIDE | −1.02 | SIDE | −0.18 |
| 0.9 FIELD | −1.01 | 0.9 FIELD | −0.21 |
| CORNER | −0.99 | CORNER | −0.28 |

EXAMPLE 1 FOCAL LENGTHS AND OTHER RELATIONSHIPS

| | |
|---|---|
| $EF_w$ = | 6.446 |
| $EF_{W(II+III)}$ = | 10.06 |
| $BF/EF_W$ = | .545 |
| $EF_{W(II+III)}/EF_W$ = | 1.56 |
| $VW/VT$ = | .999 |
| $EF_{II}/EF_W$ = | 1.652 |

Example 1 is a 3X zoom finder which is quite well corrected with a well controlled eye position despite a separation between the inverted image and the field lens of more than 3.5 min. Eye relief is 13.5 mm. All elements are made out of methylacryate.

EXAMPLE 2

| SURF. | CLEAR APER. | AXIAL BEAM | RADIUS | THICKNESS | INDEX | V |
|---|---|---|---|---|---|---|
| 1 | 6.36 | 2.00 | 12.3600 | 1.00 | 1.492 | 57.4 |
| 2 | 5.29 | 1.94 | ASPHERE | A | | |
| 3 | 9.37 | 1.98 | 6.29900 | 3.000 | 1.492 | 57.4 |
| 4 | 8.87 | 1.83 | ASPHERE | B | | |
| 5 | 9.48 | 1.51 | ASPHERE | 3.300 | 1.492 | 57.4 |
| 6 | 9.79 | 1.25 | −8.54700 | 6.581 | | |
| 7 | 7.76 | 0.05 | PLANO | 31.900 | 1.590 | 30.9 |
| 8 | 8.82 | 3.88 | −21.6700 | 0.400 | | |
| 9 | 8.70 | 3.91 | ASPHERE | 1.500 | 1.492 | 57.4 |
| 10 | 8.64 | 4.04 | −16.3130 | 13.500 | | |

ASPHERIC EQUATION $$x = \frac{CY^2}{1 + \sqrt{1 - (k+1)C^2Y^2}} + DY^4 + EY^6 + FY^8 + GY^{10}$$

| SURF. 2 | $C = 0.1649893$ | $D = -0.4835800E{-}03$ | $F = 0.3535910E{-}04$ |
|---|---|---|---|
| | $k = 0.0000000$ | $E = -0.3029500E{-}03$ | $G = -0.1088450E{-}05$ |
| SURF. 4 | $C = 0.0221058$ | $D = 0.1881300E{-}02$ | $F = 0.1415010E{-}05$ |
| | $k = 0.0000000$ | $E = -0.2268120E{-}04$ | $G = 0.0000000E{+}00$ |
| SURF. 5 | $C = 0.0710177$ | $D = -0.8288200E{-}03$ | $F = -0.2255280E{-}05$ |
| | $k = 0.0000000$ | $E = 0.4461610E{-}04$ | $G = 0.3970820E{-}07$ |
| SURF. 9 | $C = -0.0213161$ | $D = -0.2033400E{-}03$ | $F = -0.1567160E{-}05$ |
| | $k = 0.0000000$ | $E = 0.2155670E{-}04$ | $G = 0.3843810E{-}07$ |

| MAG. | STOP DIAM. | FINDER LENGTH | FINDER LENGTH W/PRISM FOLD | ZOOM SPACINGS A | ZOOM SPACINGS B | SEMI-FIELD |
|---|---|---|---|---|---|---|
| 0.314 | 4.15 | 59.044 | 34.844 | 9.870 | 1.493 | 30.42 |
| 0.388 | 3.84 | 59.044 | 34.844 | 6.608 | 4.755 | 25.39 |
| 0.480 | 3.47 | 59.044 | 34.844 | 3.513 | 7.850 | 20.45 |
| 0.592 | 3.36 | 59.044 | 34.844 | 0.491 | 10.872 | 16.40 |

| MAG. | STOP DIAM. | FINDER LENGTH | FINDER LENGTH W/PRISM FOLD | ZOOM SPACINGS A | ZOOM SPACINGS B | SEMI-FIELD |
|---|---|---|---|---|---|---|
| 0.314 | 4.15 | 59.044 | 34.844 | 9.870 | 1.493 | 30.42 |
| 0.388 | 3.84 | 59.044 | 34.844 | 6.608 | 4.755 | 25.39 |
| 0.480 | 3.47 | 59.044 | 34.844 | 3.513 | 7.850 | 20.45 |
| 0.592 | 3.36 | 59.044 | 34.844 | 0.491 | 10.872 | 16.40 |

EXAMPLE 2 ABERRATIONS: (Negative Astigmatism Means Tangential Field Is Closer To The Eye.)

| | .313X | .388X | .480X | .592X | | .313X | .388X | .480X | .592X |
|---|---|---|---|---|---|---|---|---|---|
| | ACCOMMODATION (DIOPTERS) | | | | | ASTIGMATISM (DIOPTERS) | | | |
| AXIS | −1.29 | −0.98 | −0.82 | −1.30 | AXIS | — | — | — | — |
| TOP | −1.34 | −0.93 | −0.69 | −1.10 | TOP | −0.32 | −0.34 | −0.19 | −0.14 |
| SIDE | −0.26 | 0.08 | 0.17 | −0.09 | SIDE | −0.04 | 0.04 | −0.14 | 0.03 |
| 0.9 FIELD | −0.26 | 0.09 | 0.21 | −0.06 | 0.9 FIELD | −0.22 | −0.12 | −0.21 | −0.08 |
| CORNER | −0.31 | 0.66 | 0.45 | 0.10 | CORNER | −0.90 | 0.45 | −0.18 | −0.23 |
| | DISTORTION (%) | | | | | LATERAL COLOR (MIN. OF ARC) | | | |
| AXIS | — | — | — | — | AXIS | — | — | — | — |
| TOP | −0.7 | −1.0 | −0.4 | 0.3 | TOP | 0.14 | −0.86 | −2.55 | −4.15 |
| SIDE | −3.5 | −4.4 | −2.4 | −0.4 | SIDE | 2.87 | 0.06 | −3.44 | −6.53 |
| 0.9 FIELD | −4.3 | −4.8 | −2.5 | −0.3 | 0.9 FIELD | 3.51 | 0.24 | −3.47 | −6.74 |

| EXAMPLE 2 ABERRATIONS: (Negative Astigmatism Means Tangential Field Is Closer To The Eye.) | | | | | | | | |
|---|---|---|---|---|---|---|---|---|
| | .313X | .388X | .480X | .592X | | .313X | .388X | .480X | .592X |
| CORNER | −5.4 | −5.7 | −2.8 | −0.0 | CORNER | 6.19 | 0.75 | −3.81 | −7.67 |

EXAMPLE 2 MASK SYSTEM
(With Field Frame 0.55 mm Prior To Surface 7).

| ACCOMMODATION (DIOPTERS) | | ASTIGMATISM (DIOPTERS) | |
|---|---|---|---|
| AXIS | −0.63 | AXIS | — |
| TOP | −0.63 | TOP | −0.12 |
| SIDE | −0.73 | SIDE | −0.15 |
| 0.9 FIELD | −0.75 | 0.9 FIELD | −0.15 |
| CORNER | −0.99 | CORNER | −0.23 |

EXAMPLE 2 FOCAL LENGTHS OF SYSTEM COMPONENTS AND OTHER RELATIONSHIPS:

| | |
|---|---|
| $EF_W$ = | 6.774 |
| $EF_{W(II+III)}$ = | 7.98 |
| $BF/EF_W$ = | .938 |
| $EF_{W(II+III)}/EF_W$ = | 1.18 |
| $VW/VT$ = | 1 |
| $EF_{II}/EF_W$ = | 2.143 |

Like Example 1, this finder also separates the field lens from the inverted image and still maintains excellent corrections and eye accommodation. Remarkably, it is a well corrected 2X zoom real image finder that moves only a single element in the zoom portion, element II. Despite moving only one element, the apparent accommodation at the eye never deviates more than a total of 0.5 diopters.

The invention has been described in detail with particular reference to a preferred embodiment thereof, but it will be understood that variations and modifications can be effected within the spirit and scope of the invention as described hereinabove and as defined in the appended claims.

We claim:

1. A zoom real image finder having, from the object side to the eye side, a zoom portion and a field lens which create an inverted image of the object at an inverted image plane and erecting optics and a viewfinder to enable an eye to see the inverted image as an erect image, wherein the following inequality is maintained:

$$BF/EF_W > 0.4$$

wherein BF is equal to the distance between the field lens and the inverted image and $EF_W$ is the combined focal length of all elements on the object side of the erecting optics.

2. The finder according to claim 1 wherein $BF/EF_W > 0.7$.

3. The finder according to claim 1 wherein the zoom portion includes two elements, and the finder, maintains the following inequality:

$$1.0 < |EF_{W(II+III)}/EF_W| < 1.9$$

wherein $EF_{W(II+III)}$ is the combined focal length of the element of the zoom portion nearest the eye and the field lens when the finder is in its most wide angle position.

4. The finder according to claim 1 wherein the zoom portion has only two elements and the following inequalities are maintained:

$$1.4 < EF_{II}/EF_W < 2.5$$

$$0.9 < VW/VT < 1.1$$

where $EF_{II}$ is the focal length of the element of the zoom portion closest to the eye; and VW and VT are the vertex to vertex length of the lens in its unfolded condition in its wide angle and telephoto positions, respectively.

5. The finder according to claim 3 wherein the zoom portion has only two elements and the following inequalities are maintained:

$$1.4 < EF_{II}/EF_W < 2.5$$

$$0.9 < VW/VT < 1.1$$

where $EF_{II}$ is the focal length of the element of the zoom portion closest to the eye; and VW and VT are the vertex to vertex length of the lens in its unfolded condition in its wide angle and telephoto positions, respectively.

6. A real image zoom finder constructed according to the following tables wherein all distances are in millimeters, the surfaces are numbered from the object side to the eye side, index of refraction is for the helium d line of the spectrum and V is the abbe dispersion number:

| SURF. | CLEAR APER. | AXIAL BEAM | RADIUS | THICKNESS | INDEX | V |
|---|---|---|---|---|---|---|
| 1 | 8.48 | 2.78 | 836.600 | 1.000 | 1.492 | 57.4 |
| 2 | 7.05 | 2.78 | ASPHERE | A | | |
| 3 | 5.88 | 2.96 | 8.06200 | 2.000 | 1.492 | 57.4 |
| 4 | 6.18 | 2.95 | ASPHERE | B | | |
| 5 | 9.08 | 0.96 | ASPHERE | 2.659 | 1.492 | 57.4 |
| 6 | 8.91 | 0.65 | −41.0030 | 4.027(BF) | | |
| 7 | 8.00 | 0.09 | PLANO | 30.500 | 1.492 | 57.4 |
| 8 | 8.33 | 3.84 | PLANO | 0.340 | | |
| 9 | 8.34 | 3.90 | ASPHERE | 1.700 | 1.492 | 57.4 |
| 10 | 8.39 | 4.09 | −11.4190 | 13.500 | | |

ASPHERIC EQUATION $$x = \frac{CY^2}{1 + \sqrt{1 - (k+1)C^2Y^2}} + DY^4 + EY^6 + FY^8 + GY^{10}$$

| SURF. | | | |
|---|---|---|---|
| SURF. 2 | C = 0.1310273 | D = 0.5382800E–02 | E = –0.598600E–03 |
| | k = –24.2420000 | F = 0.4001590E–04 | G = –0.1121650E–05 |
| SURF. 4 | C = –0.0729661 | D = 0.4492600E–03 | E = 0.7668210E–04 |
| | k = –2.2770000 | F = –0.3328960E–05 | G = –0.7884800E–08 |
| SURF. 5 | C = 0.1092896 | D = 0.1927100E–02 | E = –0.7536170E–04 |
| | k = –18.4040000 | F = 0.1566340E–05 | G = –0.1207280E–07 |
| SURF. 9 | C = 0.0008410 | D = –0.7906160E–04 | E = –0.1055140E–04 |
| | k = 0.0000000 | F = 0.6476000E–06 | G = 0.1545250E–07 |

15

| MAG. | STOP DIAM. | FINDER LENGTH | FINDER LENGTH W/PRISM FOLD | ZOOM SPACINGS A | B | SEMI-FIELD |
|---|---|---|---|---|---|---|
| 0.281 | 4.18 | 62.709 | 39.009 | 11.944 | 8.539 | 33.85 |
| 0.390 | 3.48 | 60.370 | 36.670 | 7.075 | 11.069 | 24.79 |
| 0.541 | 3.42 | 60.407 | 36.707 | 3.562 | 14.619 | 17.31 |
| 0.753 | 3.63 | 62.781 | 39.081 | 1.026 | 19.529 | 12.11 |

7. A real image zoom finder constructed according to the following tables wherein all distances are in millimeters, the surfaces are numbered from the object side to the eye side, index of refraction is for the helium d line of the spectrum and V is the abbe dispersion number:

| SURF. | CLEAR APER. | AXIAL BEAM | RADIUS | THICKNESS | INDEX | V |
|---|---|---|---|---|---|---|
| 1 | 6.36 | 2.00 | 12.3600 | 1.00 | 1.492 | 57.4 |
| 2 | 5.29 | 1.94 | ASPHERE | A | | |
| 3 | 9.37 | 1.98 | 6.29900 | 3.000 | 1.492 | 57.4 |
| 4 | 8.87 | 1.83 | ASPHERE | B | | |
| 5 | 9.48 | 1.51 | ASPHERE | 3.300 | 1.492 | 57.4 |
| 6 | 9.79 | 1.25 | –8.54700 | 6.581 | | |
| 7 | 7.76 | 0.05 | PLANO | 31.900 | 1.590 | 30.9 |
| 8 | 8.82 | 3.98 | –21.6700 | 0.400 | | |
| 9 | 9.70 | 3.91 | ASPHERE | 1.500 | 1.492 | 57.4 |
| 10 | 8.64 | 4.04 | –16.3130 | 13.500 | | |

ASPHERIC EQUATION $$x = \frac{CY^2}{1 + \sqrt{1 - (k+1)C^2Y^2}} + DY^4 + EY^6 + FY^8 + GY^{10}$$

| SURF. | | | |
|---|---|---|---|
| SURF. 2 | C = 0.1649893 | D = –0.4835800E–03 | F = 0.3535910E–04 |
| | k = 0.0000000 | E = –0.3029500E–03 | G = –0.1088450E–05 |
| SURF. 4 | C = 0.0221058 | D = 0.1881300E–02 | F = 0.1415010E–05 |
| | k = 0.0000000 | E = –0.2268120E–04 | G = 0.0000000E+00 |
| SURF. 5 | C = 0.0710177 | D = –0.8288200E–03 | F = –0.2255280E–05 |
| | k = 0.0000000 | E = 0.4461610E–04 | G = 0.3970820E–07 |
| SURF. 9 | C = –0.0213161 | D = –0.2033400E–03 | F = –0.1567160E–05 |
| | k = 0.0000000 | E = 0.2155670E–04 | G = 0.3843810E–07 |

| MAG. | STOP DIAM. | FINDER LENGTH | FINDER LENGTH W/PRISM FOLD | ZOOM SPACINGS A | B | SEMI-FIELD |
|---|---|---|---|---|---|---|
| 0.314 | 4.15 | 59.044 | 34.844 | 9.870 | 1.493 | 30.42 |
| 0.388 | 3.84 | 59.044 | 34.844 | 6.608 | 4.755 | 25.39 |
| 0.480 | 3.47 | 59.044 | 34.844 | 3.513 | 7.850 | 20.45 |
| 0.592 | 3.36 | 59.044 | 34.844 | 0.491 | 10.872 | 16.40 |

8. A zoom real image finder having from the object side to the eye side a zoom portion consisting of a fixed negative element and a positive element movable for zooming, a single element field lens, inverting optics and an eyepiece, wherein the single movable element in the zoom portion provides a zoom ratio of 2:1 with an apparent accommodation at the eye which never deviates more than a total of 0.5 diopters.

* * * * *